(12) United States Patent
Bekooij

(10) Patent No.: US 8,074,031 B2
(45) Date of Patent: Dec. 6, 2011

(54) MULTI-PROCESSOR CIRCUIT WITH SHARED MEMORY BANKS

(75) Inventor: Marco J. G. Bekooij, 'S Hertogenbosch (NL)

(73) Assignee: NXP B.V., Eindhoven (NL)

( * ) Notice: Subject to any disclaimer, the term of this patent is extended or adjusted under 35 U.S.C. 154(b) by 838 days.

(21) Appl. No.: 12/158,316

(22) PCT Filed: Dec. 13, 2006

(86) PCT No.: PCT/IB2006/054807
§ 371 (c)(1),
(2), (4) Date: Jun. 20, 2008

(87) PCT Pub. No.: WO2007/072324
PCT Pub. Date: Jun. 28, 2007

(65) Prior Publication Data
US 2008/0301354 A1 Dec. 4, 2008

(30) Foreign Application Priority Data

Dec. 20, 2005 (EP) .................................. 05112468

(51) Int. Cl.
*G06F 12/02* (2006.01)
(52) U.S. Cl. ............... 711/151; 711/165; 711/E12.084; 711/E12.002

(58) Field of Classification Search ............ 711/150, 711/151
See application file for complete search history.

(56) References Cited

U.S. PATENT DOCUMENTS

| | | | | |
|---|---|---|---|---|
| 6,226,726 B1 * | 5/2001 | Kermani et al. | | 711/170 |
| 6,965,974 B1 * | 11/2005 | Bays et al. | | 711/153 |
| 2005/0132140 A1 * | 6/2005 | Burger et al. | | 711/128 |

FOREIGN PATENT DOCUMENTS

WO 03/085524 A2 10/2003

* cited by examiner

*Primary Examiner* — Shane M Thomas

(57) ABSTRACT

A plurality of processors in a multiprocessor circuit is electrically connected to a plurality of independently addressable memory banks via a connection circuit. The connection circuit is arranged to forward addresses from a combination of the processors to addressing inputs of memory banks selected by the addresses. The connection circuit provides for a conflict resolution scheme wherein at least one of the processors is associated with one of the memory banks as an associated processor. The connection circuit guarantees the associated processor a higher minimum guaranteed access frequency to the associated memory banks than to non-associated memory banks. A defragmenter detects data associated with a task running on the associated processor that is stored on one of the memory banks and moves the data to the associated memory banks during execution of the task.

8 Claims, 3 Drawing Sheets

MULTI-PROCESSOR CIRCUIT WITH SHARED MEMORY BANKS

The invention relates to a multi-processor circuit.

Memory access conflicts from a source of problems of multi-processor circuits. In a simple multi-processor system, each processor is provided with its own memory bank to which only it has access. Thus, no access conflicts occur, but the memory bank has to be dimensioned to support the most demanding tasks, which means a considerable overhead for other tasks. Also, inter-processor communication cannot be performed via memory banks that are accessible only to a single processor.

An alternative solution is to use a shared memory for all processors. However, this slows down the multiprocessor system in case of access conflicts. This problem has been mitigated by providing cache memories, each between a respective one of the processors and the main memory. However, cache memories significantly degrade worst-case performance of the system (long response time may occur dependent on the combination of tasks performed by a processor). This makes cache memories unattractive for running a plurality of real-time tasks, which have to have a minimum guaranteed worst-case performance. Use of cache memories also complicates memory design, when consistency has to be maintained between different cache memories.

Among others, it is an object of the invention to provide for a multi-processor system with improved worst-case performance, which makes efficient use of memory.

According to one aspect a multiprocessor circuit according to claim 1 is provided. Herein a plurality of processors has parallel access to the same memory banks. A differentiated conflict resolution scheme is used so that a processor is given a higher minimum guaranteed access frequency to at least one memory bank than to other banks. Preferably each processor is given a higher minimum guaranteed access frequency to a respective memory bank than to other banks. A defragmenter is provided that operates in parallel with tasks executed by the processors to detect data associated with a task running on a processor that is stored in a memory bank that is not the associated bank of the processor. Address mapping is changed on the run as the data is moved. Thus, worst-case performance is improved, creating more room for adding new tasks without violating real-time requirements for example.

Preferably a storage element is provided for storing a threshold address for distinguishing between addresses that are mapped to according to respective mapping before and after said remapping. This threshold address is changed step by step while the data is moved, allowing a task to continue addressing the data during movement of a block of data.

In a typical embodiment a processor is arranged to address its associated one of the memory banks and the other ones of the memory banks as respective parts of a single address space, which at least overlaps with an address space another one of the processors. Thus, a processor is able to address memory locations in its associated memory bank and the other memory banks (from which the defragmenter moves the data) with the same type of instruction and the same type of address. This makes it possible to use the memory banks as one large memory for memory-demanding tasks, while using the same memory to improve performance for other tasks that need to address only within one memory bank.

Preferably the defragmenter provides for cross-wise defragmentation, data being moved from one memory bank to another or vice versa to improve performance, dependent on the processor which executes the task, so that the data is moved to the memory bank that is associated with the processor. Thus, a plurality of tasks can be executed in parallel with improved performance.

Typically the defragmenter is coupled to the memory banks in parallel with the processors, but it is granted access to the memory banks with a lower access priority than the processors.

In one embodiment, simple address mapping circuits are used that add different base addresses to addresses from the processors, dependent on whether the address from the processor is on one side of a threshold address up to which the data has been moved or on another side. The defragmenter updates the base addresses and the threshold address. A memory mapping circuit may be provided to define a plurality of mappings for different address ranges. In this case the defragmenter updates the addresses in the memory-mapping unit.

Advantageously, a multiprocessor circuit is provided wherein address spaces of processors (addresses in a continuous range of addresses) map distributed over the memory banks, the banks to which addresses from different processors map overlapping with one another. Preferably the connection circuit assigns access priority levels based on the access addresses, so that for each bank a set of relative priorities is defined for the processors, the sets of relative priorities being different for different banks.

These and other objects and advantageous aspects of the invention will become clear from a description of exemplary embodiments using the following Figures.

Figure 1:
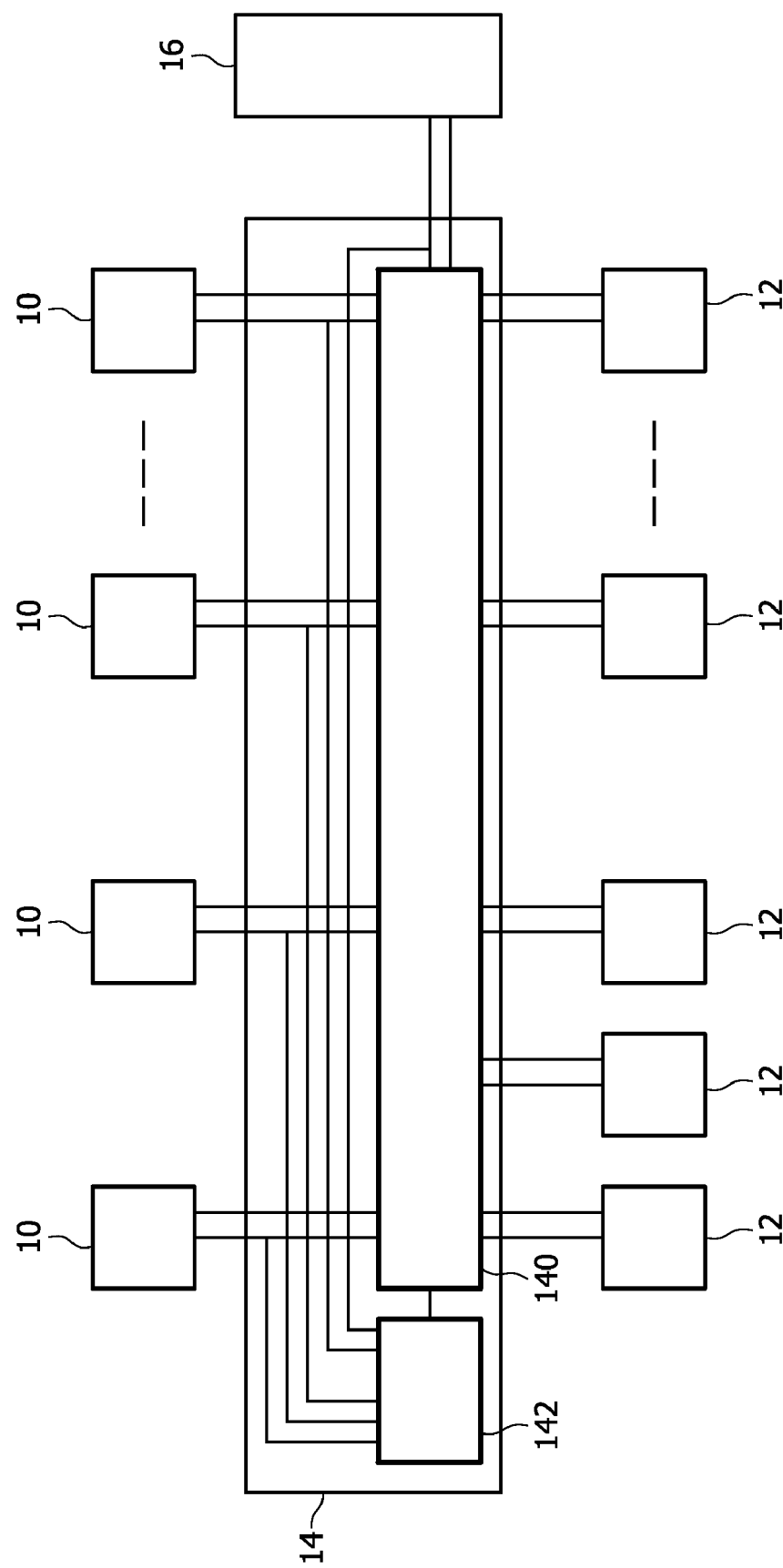
FIG. 1 shows a data processing circuit

FIG. 1 shows a data processing circuit comprising a plurality of processors 10, a plurality of memory banks 12, a connection circuit 14 and a defragmenter 16. Processors 10 and defragmenter 16 are coupled to memory banks 12 via connection circuit 14. Connection circuit 14 comprises a crossbar switch circuit 140 and an address arbiter 142. Address outputs and data input/outputs of processors 10 and defragmenter 16 are coupled to crossbar switch circuit 140. Address inputs and data input/outputs of memory banks 12 are coupled to crossbar switch circuit 140. The address outputs of processors 10 and defragmenter 16 are coupled to address arbiter 142, which has outputs (only one shown) coupled to switching control inputs of cross-bar switch circuit 140 and to acknowledge inputs of processors 10. Preferably, defragmenter 16 is coupled to the memory banks 12 as another processor like processors 10, with access to all memory banks, but with a lower priority. Although a single arbiter 142 is shown schematically, it should be appreciated that arbiter 142 may be composed of distributed arbiter circuits for respective memory banks 12. Similarly, defragmenter 16 may contain distributed defragmenter circuits e.g. for respective processors 10. Connection circuit 14 may contain address translation circuits (not shown) for translating addresses from processors 10 typically before application to arbiter 142 and crossbar switch 140.

In operation, processors 10 execute programs of instructions, which define processing tasks. Typically a plurality of tasks is executed concurrently. At least some of the instructions, such as read and write (load/store) instructions cause processors 10 to access memory banks 12. Connection circuit 14 and memory banks 12 operate in successive access cycles in each of which a different combinations of addresses may be applied. When a processor 10 accesses memory banks 12 in an access cycle, the processor 10 applies an address to connection circuit 14. Connection circuit 14 determines to which of memory banks 12 the address maps and routes at least part of the address to one of its outputs that is coupled to the addressed memory bank 12 for that access cycle. Correspondingly, data is routed between the addressed memory bank and the processor 10 for that access cycle (from the processor 10 to the memory bank 12 in the case of a write operation and from the memory bank 12 to the processor 10 in the case of a read operation). The corresponding data for that access cycle may be routed simultaneously with the address, but alternatively, some form of pipelined operation may be used, the data being routed when addresses are applied and/or routed for a subsequent access cycle.

At least some of processors 10 are capable of addressing a same one of memory banks 12. In one embodiment, all processors 10 are capable of addressing all memory banks 12. In another embodiment each processor 10 is capable of addressing a subset of N (N=2 or 3 for example) of the memory banks 12, the subsets for respective processors partly overlapping each other, for example in a chain-wise fashion. Crossbar switch circuit 140 provides for routing of address and data between those processors 10 that are capable of addressing a memory bank 12 and that memory bank 12.

In an embodiment each processor 10 addresses a plurality of consecutive memory banks 12 using contiguous addresses, a first consecutive address outside a first memory bank 12 addressing a first address in the next consecutive memory bank 12. Thus, each processor 10 "sees" its plurality of memory banks effectively as one large memory space, the memory spaces of different processors 10 at least partly overlapping each other.

If only one processor 10 addresses a specific memory bank 12 in an access cycle, arbiter circuit 142 grants access to that specific memory bank 12 to that processor 10 in the access cycle. But because processors 10 are capable of addressing a same memory bank 12, there is a possibility that a plurality of processors 10 will attempt to supply an address to a same one of memory banks 12 in the same access cycle, so that a bank conflict arises. Address arbiter 142 resolves these conflicts, by granting access respective processors 10 to respective memory banks 12. Address arbiter 142 defines associations between processors 10 and memory banks 12. The processor 10 associated to a memory bank 12 is one of the processors 10 that can address the memory bank 12. In one example, each processor 10 is associated to a respective memory bank 12, and optionally there are one or more memory banks 12 that are not associated to any processor 10.

In at least a predetermined fraction of the access cycles, for example in each second cycle or each third cycle, arbiter 142 always grants access to the processor 10 associated with a memory bank 12 when more than one processor 10, including the processor 10 associated with the memory bank 12 address the memory bank 12. In access cycles outside said fraction arbiter 142 uses some starvation preventing selection scheme like round robin selection to select any one of the processors 10 when more than one processor 10 address the memory bank 12, even if these processors 10 include the processor 10 associated with the memory bank 12. In said fraction of the access cycles address arbiter 142 grants another processor (not the associated processor) access to the memory bank only if the associated processor 10 does not address the memory bank 12. When it is possible that more than one not-associated processor 10 can address a memory bank at the same time another mechanism may be used to resolve these conflicts. For example, address arbiter 142 may assign a ranking of processors 10 to a memory bank 12, the highest-ranking processor 10 that addresses the bank being granted access. In another example address arbiter 142 grants the not-associated processors access in round robin fashion.

Address arbiter 142 controls cross-bar switch circuit 140 to route the address and data between memory bank 12 and the processor 10 that has been granted access, send an acknowledge signal to that processor 10 to indicate that access has been granted and denial of acknowledge signal to the processors 10 that have addressed the memory bank 12 but have not been granted access.

As will be appreciated this scheme guarantees that each processor 10 will be able to access memory banks 12 at least with a predetermined minimum guaranteed frequency, the predetermined minimum guaranteed frequency being higher for associated memory banks 12 than for non-associated memory banks 12. For example, if the associated processor gets absolute priority every M (0<M<N) out of N access cycles (N>1) and priority on an equal round robin basis with P other processors in other access cycles, then the minimum guaranteed access frequency Fa to the associated memory bank 12 is Fa=(M+(N−M)/P)/N, whereas the minimum guaranteed access frequency Fn to other memory banks 12 is Fn=(N−M)/(P*N). It should be appreciated that various alternative schemes can be used to realize different minimum guaranteed access frequencies, such as for example round robin selection of processors 10 that address a memory bank 12, with the associated processor 10 of a memory bank 12 having more turns in the round robin sequence than non-associated processors 10. For example if a round robin sequence of N (N>2) turns is used with Q (Q>1) turns for the associated processor 10 and R (0<R<Q) turns (R=1 for example) for not associated processors 10 then the minimum guaranteed access frequency to the associated memory bank 12 is Fa=Q/N, whereas the minimum guaranteed access frequency to other memory banks 12 is Fn=R/N. In the case that non-real time tasks are executed, alternative priority schemes may be used that do not guarantee a minimum guaranteed access frequency greater than zero to non-associated memory banks 12.

Connection circuit 14 and or processors 10 provide for variable mapping of addresses from processors 10 to addresses in memory banks 12. Preferably, both the memory bank 12 to which an address maps and the location within the memory to which an address maps are adjustable.

Figure 2:
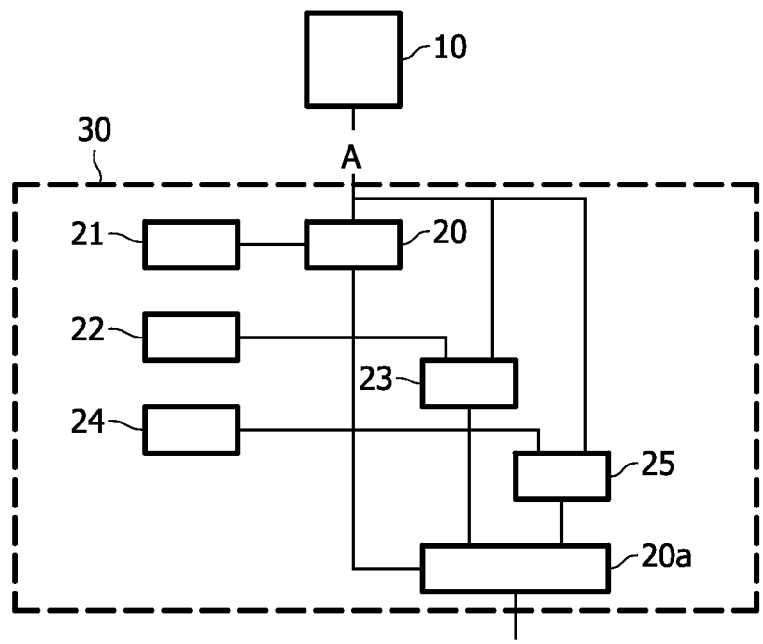
FIG. 2, 2a show an address control part

FIG. 2 shows an embodiment of a part of the connection circuit 14 that provides for address mapping of addresses from a processor 10. Data connections have been omitted for the sake of clarity. The connection circuit has an input A for receiving an address A from the processor 10. The connection circuit comprises an address mapping circuit 30 comprising a comparator 20, a threshold register 21, a first base register 22, a first adder 23, a second base register 24, a second adder 25 and a multiplexer 20a.

This part of the connection circuit is used when the processor 10 outputs logical addresses, which are converted to physical addresses in memory banks 12. Comparator 20 compares the logical address A from the processor 10 with a threshold that indicates a transition address. The threshold comes from threshold register 21. First base register 22 and first adder 23 serve to compute a physical address when the logical address is below the threshold, by adding a base value to the logical address from the processor 10. Similarly second base register 24 and second adder 25 serve to compute a physical address in the second memory bank 12b, when the logical address is equal to or above the threshold, by adding an base value to the logical address from the processor 10. Comparator 20 controls multiplexer 20a to pass the physical address from first or second adder 23, 25 according to whether the logical address is below the threshold or not. The resulting address is then used by the arbiter (not shown) and passed by the crossbar switch (not shown) to address a memory bank 12.

Similar circuits may be used for each of the processors 10. The content of registers 21, 22, 24, may be updated for example each time when a processor 10 switches from one task to another, or under control of defragmenter 16. In a further embodiment a memory mapping unit may be used with a memory (not shown) with a plurality of memory locations instead of registers 21, 22, 24, the threshold values and the base values being selected from this memory under control of the logical address and/or a task identification. Thus a form of granular memory mapping may be realized.

In the embodiment wherein processors 10 address memory banks 12 as consecutive parts of a larger memory space simple adders 23, 25 suffice. Alternatively, a memory bank selection signal may be generated dependent on the address, for example by comparator 20.

Figure 2A:
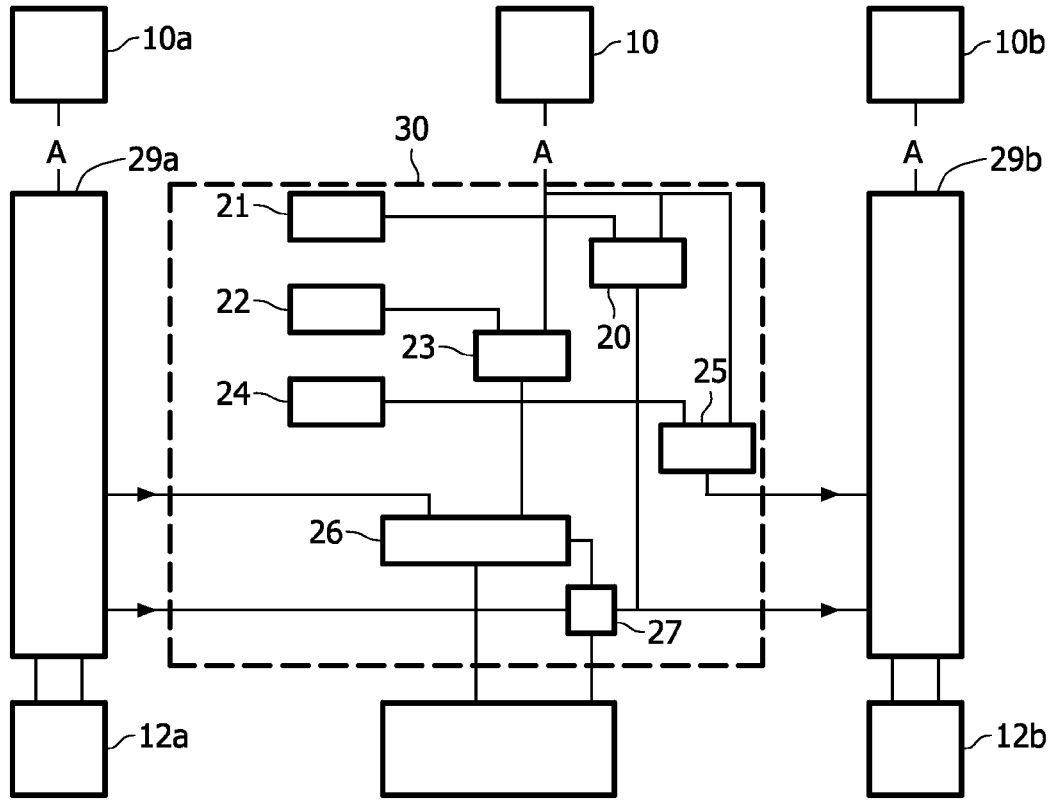

FIG. 2a shows an alternative embodiment of a part of the connection circuit 14 that provides for address mapping of addresses from a processor 10. Data connections have been omitted for the sake of clarity. The connection circuit comprises an address mapping circuit 30 comprising a comparator 20, a threshold register 21, a first base register 22, a first adder 23, a second base register 24, a second adder 25, a multiplexer 26 and an arbiter 27.

This part of the connection circuit is used when the processor 10 outputs logical addresses, which are converted to physical addresses in a first and second memory bank (12, 12b). Comparator 20 compares the logical address A from the processor 10 with a threshold that indicates a highest logical address stored in a first memory bank. The threshold comes from threshold register 21. First base register 22 and first adder 23 serve to compute a physical address in the first memory bank 12, by adding an base value to the logical address from the processor 10. Similarly second base register 24 and second adder 25 serve to compute a physical address in the second memory bank 12b, by adding an base value to the logical address from the processor 10.

A similar circuit 29a is used for a neighboring processor 10a. Arbiter 27 receives an output from comparator 20 and a similar output for the neighboring processor 10a. Arbiter 27 controls multiplexer 26, which receives inputs from first adder 23 and from the second adder 25 for the neighboring processor 10a. Multiplexer 26 outputs an address to the first memory bank. When the outputs of the comparators 20 indicate that both processors 10, 10a address this first memory bank, arbiter 27 grants access to a selected one of the processors 10 and controls multiplexer 26 correspondingly. A priority scheme is used that ensures that the processor 10 that produces the address at its first adder 23 gets access at least with a predetermined minimum guaranteed frequency, which is higher than a corresponding minimum guaranteed frequency for other processors. In addition arbiter 27 sends signals to the processors 10, 10a via an acknowledge line (not shown) to cause the neighboring processor 10a (that did not get access) to wait. Arbiter 27 controls multiplexer 26 to pass the address from first adder 23 to the first memory bank 12.

When the outputs of the comparators 20 indicate that only one of the processors 10, 10a addresses the first memory bank 12, arbiter 27 controls multiplexer 26 to pass the address for the corresponding processor 10, 10a, from first adder 23 or from the second adder for the neighboring processor 10a. No signal is sent to make the processors 10, 10a wait. When none of the processors 10, 10a address the first memory bank 12 arbiter 27 preferably disables the first memory bank 12.

When comparator 20 indicates that the logical address A addresses a location in a second memory bank 12b this is indicated to a further circuit 29b of the type shown in the Figure. Now the address from second adder 25 is passed to second memory bank 12b when a further neighboring processor 10b does not address this second memory bank 12b.

Although circuit for a single threshold has been shown in FIG. 2, it should be understood that the circuit may be adapted to provide for a plurality of thresholds, associated with different tasks for example, each optionally having its own base addresses. Furthermore, although an embodiment with two adders is shown, followed by a multiplexer (or connections to memory) it should be appreciated that in an alternative embodiment a single adder may be used, to which one bas address or another is supplied, dependent on the result of comparison, or that in another alternative embodiment one base address may always be set to zero, so that no adder is required for that base address at all.

As shown, processors 10, 10a 10b preferably address only a local memory bank 12, to which they have access with priority and one neighboring bank 12b. This simplifies the circuit. However, with a modified circuit neighboring memory banks 12a, 12b on two sides can be addressed from a processor 10, or an even greater number of memory banks. Also, memory banks may be added for which there is no single processor that always gets priority (different processors being granted priority on a round robin basis for example).

The content of the base registers etc. in memory mapping circuit 30 is preferably set dynamically, as tasks start executing, after allocation of memory space for the tasks. Memory is released when tasks have completed execution, or are otherwise stopped. Defragmenter 16 operates to move data between memory banks 12 during execution. Defragmenter 16 is implemented for example as another processor, which is capable of addressing all memory banks 12, or as a dedicated circuit for this purpose.

Figure 3:
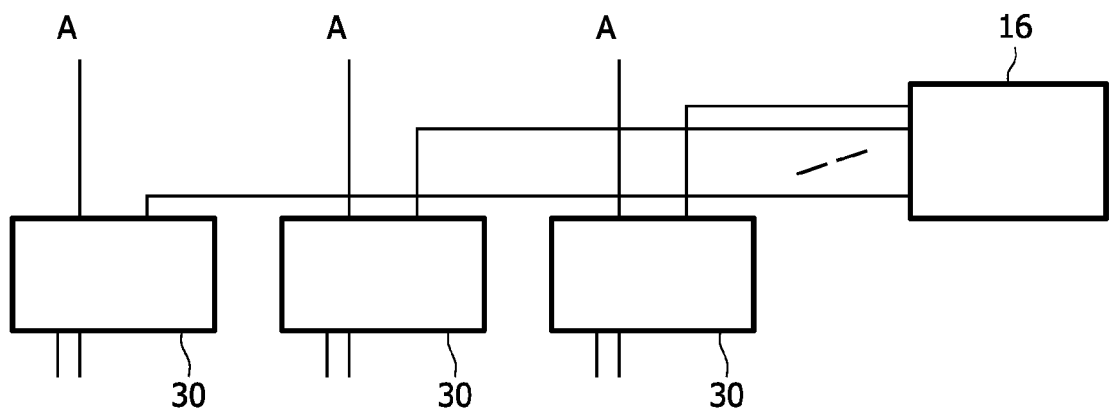
FIG. 3 shows connections to a defragmenter

FIG. 3 shows examples of connections between defragmenter 16 and a plurality of memory mapping circuits 30. Defragmenter 16 detects when data associated with execution of a task by a processor 10 is stored in a memory bank 12 that is not associated with that processor 10 (i.e. in a memory bank where that processor 10 does not always get priority). This memory bank will be referred to as the old memory bank. If data for the processor is stored in the old memory bank defragmenter 16 tests whether there is unused memory 12 in a memory bank that is associated with the processor 10 (i.e. in a memory bank where the processor always gets priority). This memory bank will be referred to as the new memory bank. If it finds unused memory, defragmenter 16 moves the data from the old memory bank to the new memory bank and updates address mapping for the moved data.

Defragmenter 16 steadily increases the threshold value with which addresses are compared. Each time defragmenter 16 reads the data for the first logical address that maps to a memory bank (the old memory bank) according to the threshold, stores this data at the physical address to which this logical address is newly mapped in a new memory bank 12 and subsequently defragmenter 16 increases the threshold. This is repeated until all possible data has been moved to first memory bank 12 (i.e. until all data has been moved, or until the logical address reaches the end of unused memory). This form of defragmenting has the advantage that it can proceed while a processor 10 continues to operate.

In an embodiment moves and updates by defragmenter are implemented in the same cycle, so that read and writes from processors 10 are prevented that intervene between reading data from an old location, writing to the new location and updating of the threshold. Alternatively, defragmenter 16 is arranged to monitors write addresses to the old memory from which it is moving data. If defragmenter detects a write to a location in the old memory that has been read to move data from the old to the new memory (i.e. before the threshold has been correspondingly increased), defragmenter 16 corrects the effect. In one embodiment defragmenter 16 does this by reading the data anew. In another embodiment defragmenter 16 captures the write data and uses this data for writing to the new memory bank.

Although not shown in FIG. 3 defragmenter 16 is preferably coupled to the arbiter circuit 142 (or arbiter circuits 32 for all memory banks 10), the arbiter circuit or circuits preferably assigning lower priority to defragmenter 16 than to processors 10. Alternatively, separate access ports to memory banks 12 may be provided for defragmenter 16.

Defragmenter 16 preferably performs detection and search by inspecting base addresses in the memory mapping circuit 30, for example by inspecting the content of the base registers etc. Alternatively, a copy of mapping information may be provided for use by defragmenter 16.

Figure 4:
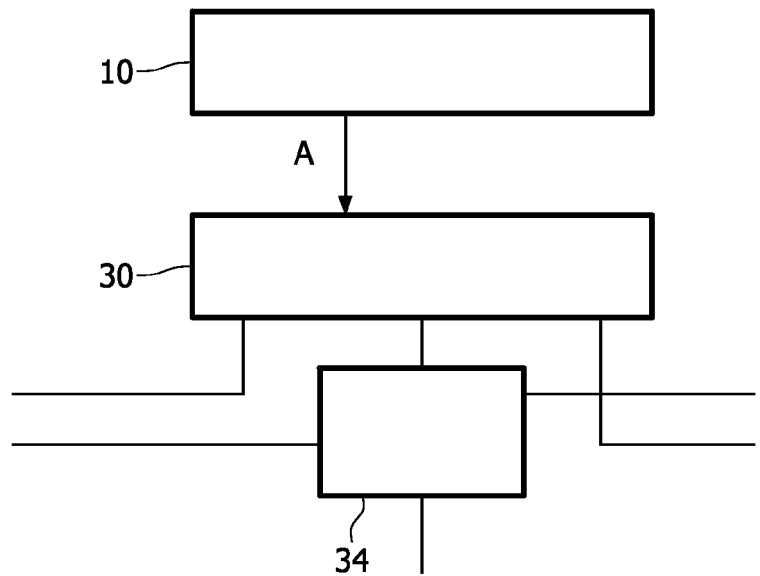
FIG. 4 shows a further address control part

FIG. 4 shows a further address control part with a processor 10, a memory mapping circuit 30 and an arbiter 32. Memory mapping circuit 30 maps logical addresses from processor 10 to different memory banks (not shown), for example on a memory line by memory line basis (using for example a table with entries for different values of a line address part of the addresses, the entries storing a memory bank ID and an offset for the addresses in that bank). Memory mapping circuit 30 outputs address data and requests to different banks dependent on the mapping of the logical address. Arbiters 32 receive the requests from memory mapping circuits 30 for different processors and grant priority in the case of a conflict, passing the address from the processor that has been granted priority to a memory bank 12. A number of arbiters 32 (only one shown) always grants priority to a corresponding predetermined processor. Preferably, each plurality of arbiters 32 is provided, at least one for each processor 10, so that each of these arbiters 32 can be associated with a processor 10 to which it will always grant priority to the same processor. But alternatively, some of the processors 10 may not have such an associated processor 10. These processors 10 will then have less real-time performance. Also preferably each such arbiter has the same number of inputs for accesses from processors 10, but this too is not necessary: arbiters 32 with mutually different numbers of input may be provided.

In the embodiment of FIG. 4 no threshold is used for mapping (blocks being mapped entirely to one memory bank or another), When this embodiment is used defragmenter 16 is arranged to use an internal threshold (progress counter) that indicates how far defragmenter 16 has progressed with copying of data. Defragmenter 16 uses the progress counter to determine whether correction is necessary after a write by the processor 10 that "owns" the data that is moved by defragmenter 16. During defragmentation this processor 10 is allowed to continue addressing the old memory bank. Defragmenter 16 detects write operations by this processor 10 that address the old memory bank. Upon detecting such a write defragmenter 16 compares the write address with the progress counter and if the write address has addressed an already copied location, defragmenter repeats copying for that write address, now with the newly written data. When the entire block has been moved, defragmenter 16 switches mapping of the block to the copied block in the new memory bank.

In this embodiment defragmenter 16 preferably operates on a line by line basis, detecting memory lines that are mapped (by a memory mapping circuit 30) to a memory bank that is not associated with the processor of the memory mapping circuit 30, and searching for memory lines that no memory mapping unit 30 maps to. When such a combination has been found defragmenter 16 copies the line from the old memory bank to the new memory bank. Preferably, the processor 10 continues to operate during this copy action. When defragmenter 16 detects a write by the processor 10 defragmenter compares the write addresses of the line and a progress counter and if it follows that the processor writes to an address of a location in the line that has already been copied, defragmenter copies the data from that location again. Each time defragmenter 16 has completed moved a memory line and then causes memory-mapping circuit 30 to update the mapping of the line.

Comparison of write addresses with addresses in the line may be performed in many ways. In one embodiment a multiplexer is provided to route write addresses from a selectable one of the processors to defragmenter 16, defragmenter controlling this multiplexer. In this case, when defragmenter 16 selects a processor 10 for which to move data, defragmenter controls the multiplexer to route write addresses from the selected processor. In another embodiment each memory mapping circuit 30 may be arranged to receive an indication of a protected memory line from defragmenter 16, to detect (write) addressing within the protected line and to signal such addressing to defragmenter 16.

Although embodiments have been shown wherein a plurality of processors 10 has access to a memory bank 12 that is associated with a processor 10 (where the processor always gets priority), it should be appreciated that in a simple alternative only the associated processor 10 has access to its associated memory bank 12 (this may apply to all or part of the processors). Thus, not-associated, shared memory banks acts as an overflow for associated memory banks 12, defragmenter 16 moving data back when possible.

Although only defragmentation has been discussed in detail, it should be appreciated that the opposite: fragmenting data moves may also occur. These may be performed for example for data for tasks that have been suspended, or which do not need real-time capability when data for a real time task has been fragmented. In this case defragmenter 16 first moves data from an associated memory bank to make room for moving other data (for a real-time task) into that memory bank. Preferably, at least part of the tasks is programmed, or is accompanied by resource information data, to indicate which data has to be available to it at real-time and when. Defragmenter 16 is preferably arranged to read such indications or to receive these indications and to select the indicated data for defragmentation (movement to a memory bank associated with the relevant processor).

In a typical example different real-time tasks are started at different times. Before such a task is started it is determined whether this task can be run with a predetermined guaranteed speed that has been specified for the task. The minimum guaranteed speed for the task is determined in view of the tasks that are already running and the memory that can be allocated for the task, if possible in the associated memory bank for a processor on which the task is to be started, but in another memory bank if insufficient memory is available in the associated memory bank. Also it is checked whether the addition of the new tasks will not reduce their minimum guaranteed speed below their specified guaranteed speed.

If the guaranteed speeds can be met the task is started, using the free memory for the task. If the free memory is not in the associated memory bank and later on another task is stopped, so that memory space in the associated memory bank is freed, the data for the task is moved to the associated memory bank while the process continues. This increases the margin between the minimum guaranteed speed and the specified guaranteed speed, creating more room for starting other tasks.

Furthermore, although simple examples have been assumed wherein each task is executed by one processor 10, it should be appreciated that in practice more complicated tasks may be executed by several processors together. In this case data for a task may be partly data that is required only at one processor and partly shared data that is requires by more than of the processors that execute the task together. In this case, each processors 10 preferably is programmed to indicate which data has to be available to it at real-time and when. Defragmenter 16 is preferably arranged to read such indications or to receive these indications and to select the indicated data for defragmentation (movement to a memory bank associated with the relevant processor 10).

Furthermore, although a scheme has been shown wherein address mapping is performed outside the processors, it should be appreciated that alternatively address mapping may be program controlled. In this case the program may use for example a base register to define addresses. In this case, defragmenter signals to the processor when and what updated mapping the processor must use.

Preferably, at most one processor 10 is associated with a memory bank 12 so that it gets a relatively high minimum guaranteed access frequency to that associated memory bank 12. Thus, because the associated memory bank 12 is not shared as an associated bank by other processors 10 that have access to that memory bank 12, a high minimum guaranteed access frequency for the associated processor 10 can be realized, which is higher than the minimum guaranteed access frequency to other memory banks 12 that are not associated with that processor 10. However, it should be understood that in a further embodiment more than one processor 10 may be associated with a same memory bank, so that each of these associated processors gets a higher minimum guaranteed access frequency to that same associated memory bank 12 than to other memory banks 12. Because the associated memory bank 12 is shared, the minimum guaranteed access frequency for the associated processors will typically be lower than when the associated memory bank is not shared, but still higher than the access frequency to other ones of the memory banks 12.

The invention claimed is:

1. A multi-processor circuit, the circuit comprising:
   a plurality of processors, each having an addressing output;
   a plurality of independently addressable memory banks, each having an addressing input;
   a connection circuit coupled between the addressing outputs and the addressing inputs, and arranged to forward addresses from a combination of the processors to addressing inputs of memory banks selected by the addresses, the connection circuit providing for a conflict resolution scheme wherein at least one of the processors is associated with an associated one of the memory banks as an associated processor, the connection circuit being arranged to guarantee the associated processor a higher minimum guaranteed access frequency to said associated one of the memory banks than to a further one of the memory banks other than the associated one of the memory banks;
   a storage element for storing a threshold address for distinguishing between addresses that are mapped to according to respective mappings before and after said remapping;
   a defragmenter, arranged to detect data associated with a task running on the associated processor that is stored on the further one of the memory banks, to move said data to the associated one of the memory banks during execution of the task in response to said detection and to cause addressing of the data by the associated processor to be remapped from said further one of the memory banks to the associated one of the banks after said moving, wherein the defragmenter is arranged to:
   move a block of data items by moving respective data items for successive addresses in the block successively during execution of the task, and to
   cause the threshold address in said storage element to be updated each time when a successive one of the data items has been moved.

2. A multi-processor circuit according to claim 1, wherein the associated processor is arranged to address the associated one of the memory banks and the further one of the memory banks as respective parts of a single address space, which at least overlaps with an address space of at least one of the processors other than the associated one of the processors.

3. A multi-processor circuit according to claim 1, wherein each processor is arranged to address all the memory banks as respective parts of a single address space.

4. A multi-processor circuit according to claim 1 wherein the connection circuit is arranged to provide access to the associated one of the memory banks and the further one of the memory banks each for a plurality of the processors, a ratio between the guaranteed access frequency for the associated one of the processors and other processors of the plurality being higher for the associated one of the memory banks than for the further one of the processors.

5. A multi-processor circuit according to claim 1 wherein the connection circuit is arranged to guarantee a further one of the processors a higher minimum guaranteed access frequency to the further one of the memory banks than to the associated ones of the memory banks, the defragmenter being arranged to detect further data associated with a further task running on the further one of the processors that is stored on the associated one of the memory banks, to move said data to the further one of the memory banks during execution of the further task and to cause addressing of the data by the further one of the processors to be remapped from said associated one of the memory banks to the further one of the memory banks after moving of the further data.

6. A multi-processor circuit according to claim 1, comprising a memory mapping circuit coupled to said associated one of the processors, arranged to map respective ranges of addresses to respective ranges of memory locations according to mapping information stored in the memory mapping circuit, and wherein the defragmenter is coupled to the memory mapping circuit, for updating the mapping information after said moving.

7. A method of operating a multi-processor circuit that comprises a plurality of processors coupled to provide access in parallel to a plurality of independently addressable memory banks, the method comprising:
   resolving access conflicts of processors to the memory banks so that each processor has a minimum guaranteed access frequency to the memory banks to which the processor has access, at least an associated processor getting a minimum guaranteed access frequency to an associated one of the memory banks than to a further one of the memory banks other than the associated one of the memory banks;

detecting data associated with a task running on the associated processor that is stored on the further one of the memory banks, moving said data to the associated one of the memory banks during execution of the task causing addressing of the data by the associated processor to be remapped from said further one of the memory banks to the associated one of the memory banks after said moving and wherein the circuit comprises a storage element for storing a threshold address for distinguishing between addresses that are mapped to according to respective mappings before and after said remapping, the method comprising:

moving a block of data items by moving respective data items for successive addresses in the block successively during execution of the task, and causing the threshold address in said storage element each time when a successive one of the data items has been moved.

8. A multi-processor circuit, the circuit comprising:

a plurality of processors, each having an addressing output;

a plurality of independently addressable memory banks, each having an addressing input;

a connection circuit coupled between the addressing outputs and the addressing inputs, and arranged to forward addresses from a combination of the processors to addressing inputs of memory banks selected by the addresses, the connection circuit providing for a conflict resolution scheme wherein at least one of the processors is associated with an associated one of the memory banks as an associated processor, the connection circuit being arranged to guarantee the associated processor a higher minimum guaranteed access frequency to said associated one of the memory banks than to a further one of the memory banks other than the associated one of the memory banks;

a defragmenter, arranged to detect data associated with a task running on the associated processor that is stored on the further one of the memory banks, to move said data to the associated one of the memory banks during execution of the task in response to said detection and to cause addressing of the data by the associated processor to be remapped from said further one of the memory banks to the associated one of the banks after said moving, wherein the defragmenter is coupled to the memory banks via the connection circuit in parallel with said processors, the connection circuit being arranged to assign a lower access priority for access from the defragmenter to the memory banks than to said processors.

* * * * *